(12) United States Patent
Swartz et al.

(10) Patent No.: US 11,969,954 B2
(45) Date of Patent: Apr. 30, 2024

(54) RESISTIVE HEATING-COMPRESSION METHOD AND APPARATUS FOR COMPOSITE-BASED ADDITIVE MANUFACTURING

(71) Applicant: Impossible Objects, Inc., Northbrook, IL (US)

(72) Inventors: Robert Swartz, Highland Park, IL (US); John Bayldon, Evanston, IL (US); Buckley Crist, Wilmette, IL (US); Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 295 days.

(21) Appl. No.: 17/198,780

(22) Filed: Mar. 11, 2021

(65) Prior Publication Data

US 2021/0291437 A1    Sep. 23, 2021

Related U.S. Application Data

(63) Continuation of application No. 15/701,098, filed on Sep. 11, 2017, now Pat. No. 10,946,592.

(Continued)

(51) Int. Cl.
*B29C 70/30* (2006.01)
*B22F 7/06* (2006.01)
(Continued)

(52) U.S. Cl.
CPC .............. *B29C 70/30* (2013.01); *B22F 7/064* (2013.01); *B22F 10/00* (2021.01); *B22F 10/20* (2021.01);
(Continued)

(58) Field of Classification Search
CPC ..... B29C 64/141; B29C 64/147; B29C 64/20; B29C 64/223; B29C 64/232; B29C 64/295; B29C 64/307; B29C 64/386; B29C 64/393; B29C 64/40; B29C 70/30; B33Y 10/00; B33Y 30/00; B33Y 40/00; B33Y 40/20; B33Y 50/02; B33Y 70/00; B33Y 70/10;
(Continued)

(56) References Cited

U.S. PATENT DOCUMENTS 5,565,117 A * 10/1996 Iwasa .................... B23K 35/002
219/85.14
2011/0188927 A1 * 8/2011 Mizrahi .................. B32B 27/28
219/118

(Continued)

*Primary Examiner* — Xiao S Zhao
*Assistant Examiner* — Joseph S Leyson
(74) *Attorney, Agent, or Firm* — Dunlap Bennett & Ludwig, PLLC

(57) ABSTRACT

A method and apparatus for resistive heating usable in composite-based additive manufacturing is disclosed. The method includes providing a prepared stack of substrate sheets, placing the stack between electrode assemblies of a compression device, applying a current to thereby heat the stack to a final temperature to liquefy applied powder, compressing the stack to a final height, cooling the stack, and removing the cooled, compressed stack from the compression device. The apparatus comprises at least two plates, a power supply for providing current, a first electrode assembly and a second electrode assembly.

31 Claims, 3 Drawing Sheets

Related U.S. Application Data

(60) Provisional application No. 62/393,063, filed on Sep. 11, 2016.

(51) Int. Cl.

| | |
|---|---|
| *B22F 10/00* | (2021.01) |
| *B22F 10/20* | (2021.01) |
| *B22F 12/90* | (2021.01) |
| *B29C 64/147* | (2017.01) |
| *B29C 64/232* | (2017.01) |
| *B29C 64/295* | (2017.01) |
| *B29C 64/307* | (2017.01) |
| *B29C 64/393* | (2017.01) |
| *B29C 67/08* | (2006.01) |
| *B33Y 10/00* | (2015.01) |
| *B33Y 30/00* | (2015.01) |
| *B33Y 40/00* | (2020.01) |
| *B33Y 50/02* | (2015.01) |
| *B33Y 70/00* | (2020.01) |
| *C22C 47/02* | (2006.01) |
| *C22C 47/20* | (2006.01) |
| *C22C 49/14* | (2006.01) |
| *B22F 3/105* | (2006.01) |
| *B22F 3/24* | (2006.01) |
| *B22F 7/04* | (2006.01) |
| *B22F 7/08* | (2006.01) |
| *B22F 10/10* | (2021.01) |
| *B29C 70/52* | (2006.01) |
| *B32B 15/00* | (2006.01) |
| *B33Y 40/20* | (2020.01) |
| *B33Y 70/10* | (2020.01) |

(52) U.S. Cl.
CPC ............ *B22F 12/90* (2021.01); *B29C 64/147* (2017.08); *B29C 64/232* (2017.08); *B29C 64/295* (2017.08); *B29C 64/307* (2017.08); *B29C 64/393* (2017.08); *B29C 67/08* (2013.01); *B33Y 10/00* (2014.12); *B33Y 30/00* (2014.12); *B33Y 40/00* (2014.12); *B33Y 70/00* (2014.12); *C22C 47/025* (2013.01); *C22C 47/20* (2013.01); *C22C 49/14* (2013.01); *B22F 2003/1051* (2013.01); *B22F 3/24* (2013.01); *B22F 7/04* (2013.01); *B22F 2007/042* (2013.01); *B22F 2007/045* (2013.01); *B22F 7/08* (2013.01); *B22F 10/10* (2021.01); *B22F 2998/10* (2013.01); *B22F 2999/00* (2013.01); *B29C 70/528* (2013.01); *B32B 15/00* (2013.01); *B33Y 40/20* (2020.01); *B33Y 50/02* (2014.12); *B33Y 70/10* (2020.01); *C22C 2200/02* (2013.01); *C22C 2200/06* (2013.01)

(58) Field of Classification Search
CPC .. B22F 7/064; B22F 7/08; B22F 10/00; B22F 10/20; B22F 12/90; B22F 2003/1051; B32B 5/08; B32B 5/26; B32B 2262/106; B32B 2307/202
See application file for complete search history.

(56) References Cited

U.S. PATENT DOCUMENTS

| | | | |
|---|---|---|---|
| 2015/0231825 A1* | 8/2015 | Swartz et al. | B32B 1/00 428/156 |
| 2015/0321417 A1* | 11/2015 | Mironets | B23P 15/00 156/263 |
| 2016/0247091 A1* | 8/2016 | McCaffrey | G06F 40/40 |
| 2018/0010237 A1* | 1/2018 | Forseth et al. | B22F 10/00 |

* cited by examiner

RESISTIVE HEATING-COMPRESSION METHOD AND APPARATUS FOR COMPOSITE-BASED ADDITIVE MANUFACTURING

This application is a continuation of U.S. application Ser. No. 15/701,098, filed Sep. 11, 2017, now U.S. Pat. No. 10,946,592, which application claims priority from and claims the benefit of U.S. Provisional Application No. 62/393,063, filed Sep. 11, 2016.

TECHNICAL FIELD OF THE INVENTION

The present invention relates to additive manufacturing and, in particular to an apparatus and process usable in manufacturing three-dimensional composite-based objects.

BACKGROUND OF THE INVENTION

Additive manufacturing, such as three-dimensional printing, can be seen as largely a materials problem. One of the limitations of current methods is a limited materials palette and slow build speeds.

These and other limitations of the prior art are avoided by a methodology known as Composite-Based Additive Manufacturing (CBAM). CBAM is described in full in U.S. patent application Ser. No. 13/582,939, filed Nov. 2, 2012, now U.S. Pat. Nos. 9,827,754, 14/835,690 filed Aug. 25, 2015, now U.S. Pat. Nos. 9,833,949, 14,835,635, filed Aug. 25, 2015, now U.S. Pat. No. 9,993,925, U.S. Provisional Patent Application No. 62/294,997 filed Feb. 12, 2016, International Application No. PCT/US17/17672 filed Feb. 13, 2017, and U.S. patent application Ser. No. 15/611,320, filed Jun. 1, 2017, now U.S. Pat. No. 10,046,552, each of which are incorporated herein by reference in their entirety.

Briefly summarized, in a preferred embodiment of CBAM, polymer powder, such as thermoplastic, is selectively deposited on substrate sheets, the sheets are stacked upon one another, and then the stack is heated and compressed to form a 3D object or multiple 3D objects. The 3D object is obtained by removing those portions of the substrate sheets that were not selectively powdered.

A prior method of performing the heating and compressing steps of CBAM is to place the stack of substrate sheets in an oven heated to a temperature required to convert the deposited thermoplastic to the liquid state (above the glass transition temperature, Tg, if amorphous, or above the melting temperature, Tm, if partially crystalline). The time required for achieving the desired temperature within the stack by oven heating is proportional to the square of the smallest stack dimension (length, width, or height) through which heat must diffuse. Therefore, construction of a 3D object of twice the height but otherwise the same width and length of another 3D object requires four times the heating time. After enough time has passed at the temperature required to melt the thermoplastic, the stack is compressed to the desired thickness to form the 3D object.

The non-linear upward scaling of the time, and consequently energy costs, required to create large 3D objects is a disadvantage when using the presently employed heating and compression methodology to create large objects. What has been needed, therefore, is a more time- and cost-efficient method for performing the heating/compression steps of the CBAM methodology.

SUMMARY OF THE INVENTION

Resistive heating according to the present invention is, in a preferred embodiment, employed in the heating—compression step of Composite-Based Additive Manufacturing (CBAM), which has been previously described in U.S. patent application Ser. No. 13/582,939, filed Nov. 2, 2012, Ser. No. 14/835,690, filed Aug. 25, 2015, Ser. No. 14/835,635, filed Aug. 25, 2015, U.S. Provisional Patent Application No. 62/294,997, filed Feb. 16, 2016, International Application No. PCT/US17/17672, filed Feb. 13, 2017, and U.S. Ser. No. 15/611,320, filed Jun. 1, 2017, each of which are incorporated herein by reference in their entirety.

BRIEF DESCRIPTION OF THE DRAWINGS

Other aspects, advantages and novel features of the invention will become more apparent from the following detailed description of the invention when considered in conjunction with the accompanying drawings wherein.

The above Figures show all or part of illustrative embodiments of this invention. The Figures do not show all of the possible details of the invention.

DETAILED DESCRIPTION OF INVENTION

The CBAM process described in the incorporated prior applications (U.S. patent application Ser. Nos. 13/582,939, 14/835,690, 14/835,635, 62/294,997, and 15/611,320, and International Application No. PCT/US17/17672) is modified by specifically performing the heating-compression steps using resistive heating.

In a resistive heating process according to the invention, the stack of powdered substrate sheets defines an appropriate geometry, such as, for example, but not limited to, a rectangular parallelepiped. The stack is heated by passing current through the body of the stack. This current may be either direct current (DC) or alternating current (AC). It is required that the stack of powdered sheets have adequate electrical conductivity, a condition that may be met, for example, by using substrates that include or are formed from conducting materials. In a preferred embodiment, the substrate comprises carbon fiber sheets. Current applied to the stack is carried through the thickness of the stack by contact between the fibers comprising the adjacent substrate sheets forming the stack. Thermoplastics being dielectric materials, the current through the plane of each substrate sheet in the stack is carried by the carbon fibers that comprise the sheet. It will be clear to one of skill in the art that resistive heating is possible with many other fiber-based materials other than carbon fibers, accompanied by suitable modification of the system when necessary to achieve the required conductivity.

Figure 1:
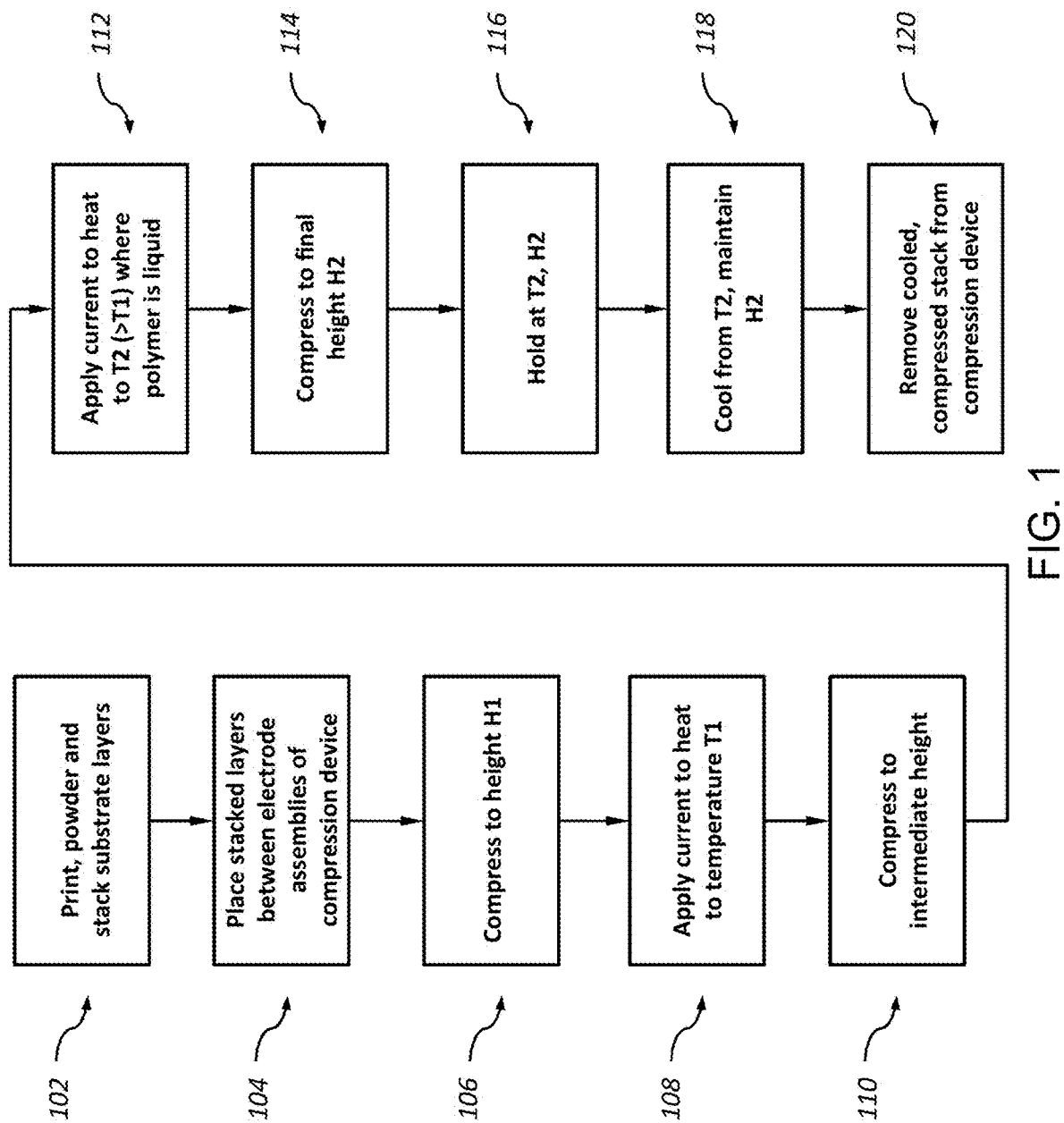
FIG. 1 is a flowchart of an embodiment of a method for resistive heating usable in Composite-Based Additive Manufacturing, according to one aspect of the invention.

FIG. 1 illustrates an embodiment of a method for construction of a 3D object using resistive heating according to one aspect of the invention. A stack of powdered substrate sheets is prepared 102, and then placed 104 between the electrode assemblies of a compression device. The compression device is used to compress the stack at room temperature to a first height H1 106 that achieves a suitable resistance in the stack in order to enable rapid heating of the stack to about 10° C. above Tg or Tm, herein referred to as T1. Power is then supplied for a current to heat 108 the stack to this first target temperature T1, whereupon the stack is compressed to an intermediate height 110 towards the final desired compression height H2. When deemed necessary, the voltage may optionally be reduced to prevent the stack from overheating. Based on the electrical resistivity of the stack at this intermediate height, the voltage is then adjusted to raise the stack to a final temperature T2 112 (T2>T1) at which the polymer becomes a liquid. Compression to the final desired height H2 is then imposed 114 and voltage is adjusted to maintain 116 the temperature at T2 for a time, typically a few minutes, in order to allow the polymer liquid to flow. The power is then reduced or turned off and the stack is cooled 118 at a rate that is appropriate for the 3D object, while maintaining the height at H2. The cooled, compressed stack is then removed 120 from the compression device.

In some embodiments, additional compression steps with additional intermediate heights and target temperatures are employed. Indeed, one can continuously vary height between H1 and H2, and additionally, or alternatively, continuously vary temperature between room temperature and the final target temperature T2.

Figure 2B:
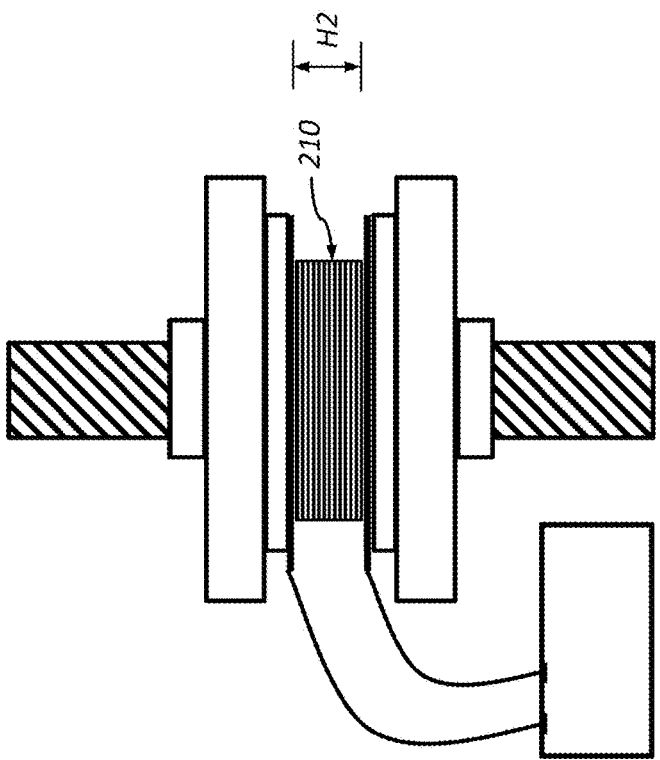
FIG. 2B is a schematic of a compressed state of an example embodiment of an apparatus for performing resistive heating in Composite-Based Additive Manufacturing, according to one aspect of the invention.
Figure 2A:
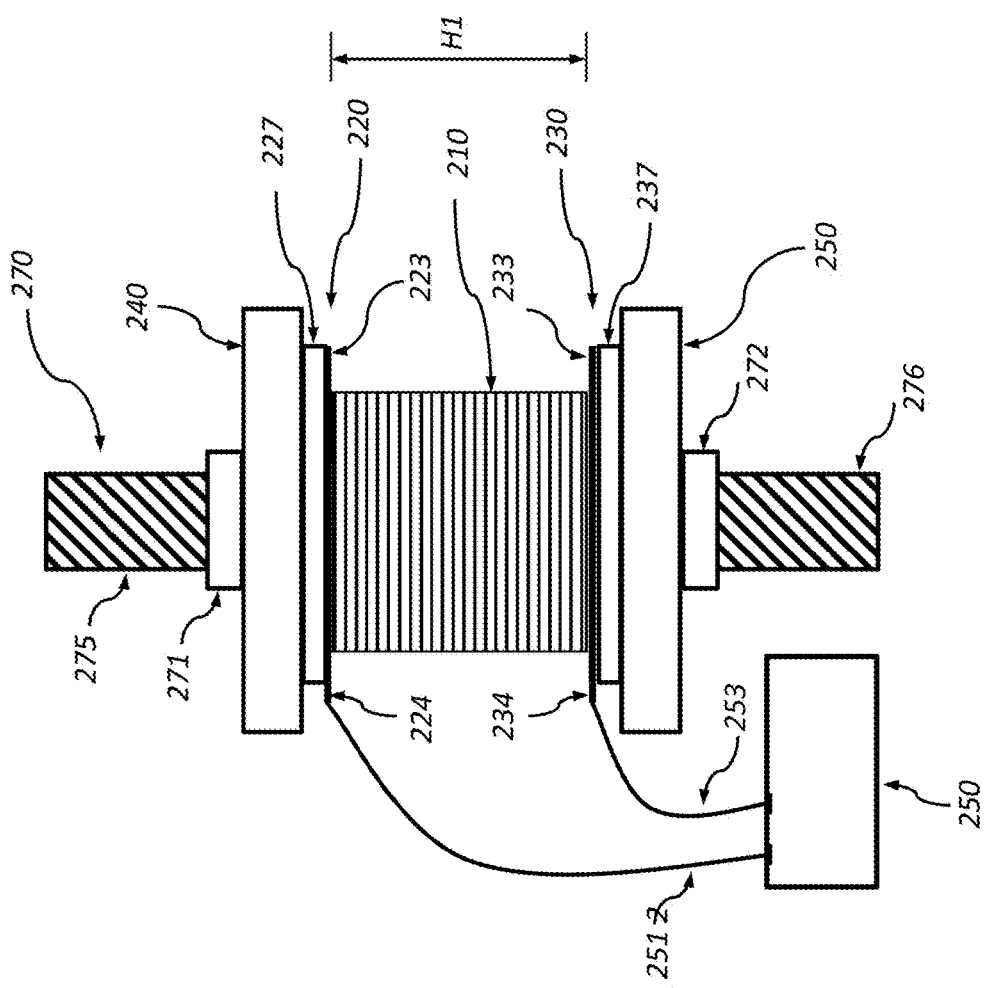
FIG. 2A is a schematic of an uncompressed state of an example embodiment of an apparatus for performing resistive heating in Composite-Based Additive Manufacturing, according to one aspect of the invention.

One implementation of a device for performing resistive heating according to the invention is illustrated in FIGS. 2A and 2B. While example components are shown in FIGS. 2A and 2B, it will be clear to one of skill in the art of the invention that various alternative and optional components are also suitable for use with the invention and are therefore to be considered as being within the scope of the invention.

As shown in FIGS. 2A and 2B, stack of powdered substrate sheets 210 is sandwiched between two electrode assemblies 220, 230 respectively including two electrodes 223, 233 that are slightly oversized with respect to the stack plan area (top and bottom) and respectively have tabs 224, 234 extending for respective power lead connections 251, 253 from power supply 250 for providing current. Electrodes 223, 233 can be any appropriate conductor that will function in the temperature and pressure range needed to melt the thermoplastic and compress the stack. For example, in one embodiment, the electrodes are constructed from 0.016" thick aluminum sheet material, but it will be clear to one of skill in the art of the invention that many suitable alternatives exist.

Each electrode 223, 233 is attached to or otherwise situated adjacent to a respective non-conducting backing plate 227, 237. The non-conducting plate prevents passage of electrical current away from the stack and may also be thermally insulating to prevent or reduce heat generated in the stack from escaping through the ends of the stack. Non-conducting plates 227, 237 may be made of any suitable materials, such as, for example, but not limited to, wood or ceramic. In the specific embodiment illustrated in FIGS. 2A and 2B, the non-conducting backing plate is made of ½ inch plywood. Electrodes 223, 233 and backing plates 227, 237 together comprise the two electrode assemblies 220, 230 that are respectively sandwiched between two pressure plates 240, 250, which are in a preferred embodiment constructed from a metal, such as, but not limited to, steel or aluminum, but which could be composed of any material suitable for applying the requisite stack pressure.

Stack compression is achieved through loading device 270, such as, but not limited to, a C-clamp or a manual or automatic press comprising upper surface 271 and lower surface 272 that are driven towards each other using, for example, but not limited to, a lead screw or hydraulic or air cylinder mechanisms 275, 276. The open space between the upper and lower surfaces of loading device 270 defines the space within which stack 210 is compressed. Electrode assemblies 220, 230, together with optional pressure plates 240, 250, if used, are situated at upper 271 and lower 272 surface of loading device 270, and stack 210 of substrate sheets is placed between electrode assemblies 220, 230. Stack 210 is compressed to initial height H1, as shown in FIG. 2A.

Power is then supplied to the electrode plates to cause current from power supply 250 to flow through stack 210. In this example implementation, the current from power supply 250 is DC, but it will be clear to one of skill in the art of the invention that AC, including pulsed or other waveform, is also suitable for use with the invention. With the power still on, the loading device is used to reduce the stack height from the initial height H1, as illustrated in FIG. 2A to a smaller height, H2, as illustrated in FIG. 2B. Reduction of stack height to about ¼ of the initial height is illustrated in FIGS. 2A and 2B, but it will be clear to one of skill in the art of the invention that other compression ratios may be suitably employed.

Stack compression is performed in conjunction with resistive stack heating. Compression and heating interact in two ways. First, the thermoplastic powder must be heated into the liquid state before the final compressed dimensions are achieved. Second, compression increases the frequency of fiber-fiber contacts within and between substrate sheets, which in turn reduces the electrical resistivity ρ (Ωm) of the stack. Maintaining the temperature in the stack as it is compressed therefore requires adjusting the voltage and/or current so that the amount of electrical power remains substantially constant. If the voltage is not adjusted while the resistivity decreases, the stack could overheat.

A preferred method of compression uses variable displacement control of the stack height. A preferred method of providing power for resistive heating is a variable DC power supply, preferably one with a power of 50 W to 1000 W and a maximum voltage of 20 V to 60 V. The power supply may be controlled manually or through a computer interface, with measurement of voltage and/or current. Actual applied power, current or voltage can be deduced through the formula P=IV, if two of the three variables are known. The stack temperature is monitored by any suitable sensor, such as for example, but not limited to, thermocouple, thermistor, or infrared sensor.

Figure 4:
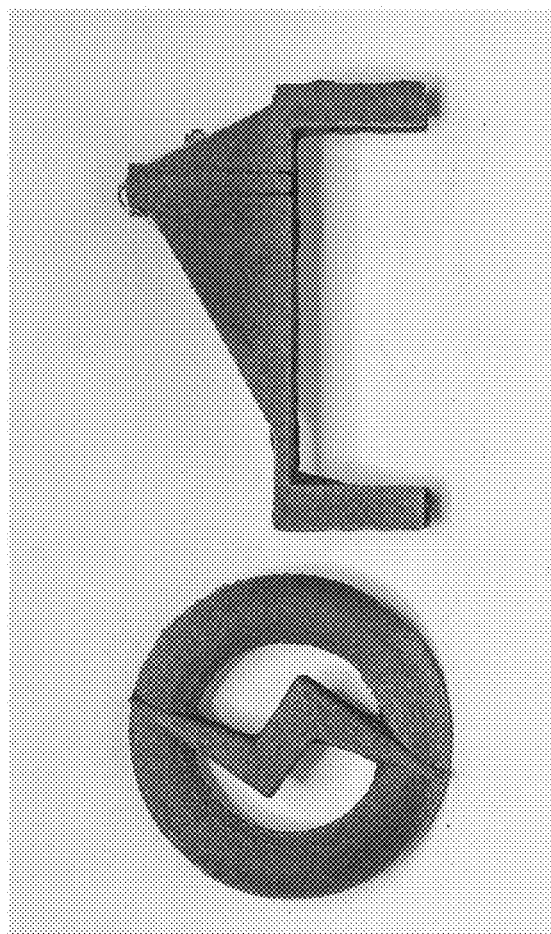
FIG. 4 is a photograph of the two 3D objects shown in FIG. 3, after removal of the portions of the substrate sheets that were not selectively powdered to reveal the completed 3D objects.
Figure 3:
FIG. 3 is a photograph of an example stack of substrate sheets that has been heated and compressed, forming two 3D objects using the methodology and apparatus of the present invention.

At the final compression height H2, the 3D object (or multiple 3D objects), comprised of the fused substrate sheets and thermoplastic, is formed. FIG. 3 is a photo of a stack of substrate sheets that has been heated and compressed to form two 3D objects in the manner described above. FIG. 4 is a photo of two 3D objects that were formed in the manner described above, which objects are shown after removal of the surrounding portions of the substrate sheets that were not selectively powdered.

There are two principal advantages of resistive heating over oven heating when used in CBAM. The first advantage is heating time. In one experiment, a stack of 120 sheets of 17 g/m² carbon fiber non-woven fabric (Hollingsworth & Vose) was selectively deposited with nylon polyamide 12 powder (Evonik). Transverse stack dimensions were 89 mm×89 mm. Resistive heating to 200° C. was achieved in 4 min. In contrast, oven heating the same size stack to 200° C. took about 60 minutes. Increasing the dimension of the stack of substrate sheets increases the mass of fiber and polymer to be heated. Resistive heating a build block that has twice the volume can be done in the same time by doubling the power, or can be done in twice the time at the same power. Larger build blocks always take longer to heat in the oven, as heat diffusion lengths are greater and there is no counterpart to increased power. Raising the oven temperature will increase the heating rate, but larger temperature gradients render the outer portions of the stack more susceptible to unwanted chemical reactions.

The second advantage of resistive heating over oven heating is the ease of performing compression. With resistive heating, the loading device remains at or near room temperature, and changing compression is straightforward. With oven heating, the hot stack of substrate sheets and all or a portion of the compression device must be manipulated inside or outside of the oven in order to compress the stack. This step can be a particular challenge with high-melting polymers such as PEEK near 400° C. Remote handling of a compression device inside the oven is of course possible, but complicated.

Some refinements to the simple process and apparatus presented in FIGS. 1 and 2A-B are described herein, but it will be clear to one of skill in the art of the invention that others are possible. For example, the heating-compression device can be thermally insulated in order to reduce heat losses. Heat loss reduction leads to faster and more uniform heating throughout the stack of substrate sheets. Insulation for the stack sides can be made of compliant material, such as, but not limited to, rockwool, wrapped around the lateral surfaces and compressed with the stack. It is also possible to construct a snug fitting box of rigid insulation, such as, but not limited to, CS85 (BNZ Materials). This latter arrangement may be configured with slots to accommodate the leads that move during compression. Alternatively, instead of passive insulation, heated plates or walls may be used to counteract heat losses from the stack.

Registration rods that pass through the stacked sheets may be used to keep the sheets aligned when compressed, increasing mechanical stability and lateral resolution of the final 3D object. Holes for such rods can be made in the electrode assemblies and pressure plates. Registration rods should preferably not conduct electricity.

The pressure plates or other surfaces used to compress the stack of substrate sheets should preferably be parallel to one another and remain so during compression. Because resistivity p has a strong negative dependence on compression, non-parallel compression plates will lead to more current and heating in regions that are compressed more.

Various methods can be employed to determine when the stack temperature has reached the target temperature T2. Suitable examples include, but are not limited to, thermocouples within the stack or on stack surfaces, infrared detection of lateral surface temperature, or pressure drop that accompanies melting at a fixed compressive height H. Other methods are possible and will be within the ability of one of skill in the art of the invention.

The process can optionally be mechanized, automated, and/or computerized. A pressure sensor can be added to track pressure, thermocouples or other temperature measuring devices can be used to measure the internal temperature of the stack, and automated hydraulic, pneumatic, or other type of mechanical system can be used to apply pressure. Additionally, a programmable power supply can be used so that voltage and current can be tracked and controlled. All or some of these devices can be optionally connected to a computer that, based on sensor readings, can control the process automatically or semi-automatically using PID or other control algorithms. These sensors and devices may of course also be used in manual implementation of the invention.

Resistive heating can be advantageously employed with substrate materials other than carbon fiber. For example, metal fiber substrates are available. Similar to carbon fiber substrates, conductivity through the thickness of the stack is accomplished by fiber-fiber contacts between adjacent sheets. Additionally, resistive heating can be achieved through the selectively deposited powder. For example, the powder may be a conducting metal rather than a thermoplastic. Resistivity p will decrease as the stack is compressed, such as with carbon fiber. As resistivities for metals are smaller than for carbon fiber, heating power may be generated with lower voltage and higher current. Substrate sheets may also alternatively be made of glass (such as, but not limited to, E-glass or S-glass) or polymer (such as, but not limited to, aromatic polyamide or polyester) fibers, which are dielectrics. In this case, adequate electrical conductivity may be achieved by adding conducting particles to either the printing ink or to the thermoplastic powder that is deposited. Once percolation is established, the resistivity would be low enough to permit resistive heating, as with carbon fibers. Alternatively, it is also possible to admix conducting fibers (such as, but not limited to, carbon or metal) to the dielectric fibers, thereby establishing adequate conductivity for resistive heating.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A method for resistive heating usable in composite-based additive manufacturing, comprising:
    providing a stack of substrate sheets that have been applied with powder;
    placing the stack between electrode assemblies of a compression device;
    compressing the stack at room temperature to a first height H1;
    applying a current between the electrode assemblies to heat the stack to a first target temperature T1;
    compressing the stack to an intermediate height that is less than H1 but greater than a final desired compression height H;
    applying a current between the electrode assemblies to thereby heat the stack to a temperature T at which the powder changes state to a converted material;
    compressing the stack to the final desired compression height H;
    cooling the stack; and removing the cooled, compressed stack from the compression device.

2. The method of claim 1, wherein compressing the stack at room temperature to the first height H1 achieves a suitable resistance in the stack in order to enable rapid heating of the stack to above the first target temperature T1.

3. The method of claim 1, wherein the first target temperature T1 is a glass transition temperature Tg if the powder used to prepare the stack of substrate sheets is amorphous.

4. The method of claim 1, wherein the first target temperature T1 is a melting temperature if the powder used to prepare the stack of substrate sheets is partially crystalline.

5. The method of claim 1, further comprising adjusting the current to prevent the stack from overheating.

6. The method of claim 1, wherein the temperature T is greater than the first target temperature T1.

7. The method of claim 1, further comprising maintaining the stack at final height H and temperature T for a set amount of time.

8. The method of claim 1, wherein the cooling is done by reducing the power of a power supply for applying the current, or by turning the power supply off.

9. The method of claim 1, further comprising continuously varying the height of the stack between an intermediate height and the final desired compression height H.

10. The method of claim 1, further comprising continuously varying the temperature between room temperature and the temperature T.

11. The method of claim 1, wherein each substrate sheet comprises fiber such that the stack of substrate sheets provides fiber-fiber contacts between and within said substrate sheets, the compressing step increases the fiber-fiber contacts within and between substrate sheets, reducing the electrical resistivity of the stack.

12. The method of claim 1, wherein the compression uses variable displacement control of the stack height.

13. The method of claim 1, wherein power for resistive heating is provided with a variable DC power to apply the current.

14. The method of claim 1, wherein a power supply to apply the current is controlled manually.

15. The method of claim 1, wherein a power supply to apply the current is controlled by a programmable computer.

16. The method of claim 1, wherein a power supply to apply the current is controlled by a programmable computer that receives sensor data and uses the sensor data to drive the method.

17. The method of claim 1, wherein the stack is monitored for temperature, current or other quantity by a computer or human and this information is used for feedback to control the method.

18. The method of claim 1, wherein the temperature of the stack is monitored by a thermocouple, thermistor, infrared sensor, or pressure drop that accompanies melting at a fixed compressive height.

19. The method of claim 18, wherein information obtained from the thermocouple, thermistor, infrared sensor or pressure drop is used for feedback by a computer or human to control the method.

20. The method of claim 1, further comprising forming a 3D object from the stack at the final compression height H.

21. The method of claim 20, wherein the 3D object is further formed by removing surrounding portions of the substrate sheets that were not selectively applied with powder.

22. The method of claim 1, further comprising applying sufficient voltage to heat the stack in a time less than oven heating would do.

23. The method of claim 1, wherein the steps occur without human intervention by being mechanized, automated, or computerized.

24. The method of claim 1, wherein the substrate sheets comprise carbon fiber.

25. The method of claim 1, wherein the substrate sheets comprise a material that heats when a current or voltage is applied.

26. The method of claim 1, wherein the powder is a thermoplastic.

27. The method of claim 1, wherein the powder is a conducting metal.

28. The method of claim 1, wherein the substrate sheets are made of glass.

29. The method of claim 1, wherein electrical conductivity of the stack is achieved at least in part through conducting particles added to a printing ink or to the powder that is deposited on the sheets.

30. The method of claim 1, wherein the substrate sheets include conducting fibers admixed with polymer fibers to establish adequate conductivity for resistive heating.

31. The method of claim 1, wherein at least part of the current is carried by carbon fibers that comprise the substrate sheets.

* * * * *